(12) United States Patent
Mohan et al.

(10) Patent No.: US 10,225,165 B2
(45) Date of Patent: Mar. 5, 2019

(54) APPARATUS AND METHOD FOR PROCESSING DATA STREAMS IN A COMMUNICATION NETWORK

(71) Applicant: TELEFONAKTIEBOLAGET LM ERICSSON (PUBL), Stockholm (SE)

(72) Inventors: Saravanan Mohan, Chennai (IN); Kumaresh Sreedhar, Chennai (IN); Divya Sundar, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 14/915,088

(22) PCT Filed: Aug. 26, 2013

(86) PCT No.: PCT/SE2013/050994
§ 371 (c)(1),
(2) Date: Feb. 26, 2016

(87) PCT Pub. No.: WO2015/030637
PCT Pub. Date: Mar. 5, 2015

(65) Prior Publication Data
US 2016/0212023 A1    Jul. 21, 2016

(51) Int. Cl.
*H04L 12/26*    (2006.01)
*H04W 28/02*    (2009.01)

(52) U.S. Cl.
CPC ........... *H04L 43/045* (2013.01); *H04L 43/16* (2013.01); *H04W 28/0284* (2013.01)

(58) Field of Classification Search
CPC ... H04L 73/045; H04L 43/16; H04W 28/0284
See application file for complete search history.

(56) References Cited

U.S. PATENT DOCUMENTS

2006/0075335 A1*  4/2006  Gloor .................... G06T 11/206
                                                              715/273
2006/0245432 A1   11/2006  Kroboth et al.
(Continued)

FOREIGN PATENT DOCUMENTS

WO           01/98916 A1    12/2001

OTHER PUBLICATIONS

Adomavicius et al., "C-TREND: Temporal Cluster Graphs for Identifying and Visualizing Trends in Multiattribute Transactional Data", 2008, IEEE Transactions on Knowledge and Data Engineering, vol. 20, No. 6 (Year: 2008).*

(Continued)

*Primary Examiner* — Ian N Moore
*Assistant Examiner* — Justin T Van Roie
(74) *Attorney, Agent, or Firm* — Rothwell, Figg, Ernst & Manbeck, p.c.

(57) ABSTRACT

A method of processing a data stream of a communication network in a distributed processing architecture comprising a plurality of processing units comprises the steps of extracting data from the data stream, wherein the data is extracted for a particular time window of a sliding time window. The extracted data is converted into a format suitable for graphical representation. A graphical representation of the converted extracted data is generated, and an estimated value of at least one structural property of the graphical representation of the data determined. The estimated value of the at least one structural property is compared with a threshold value, and a change condition reported based on the outcome of the comparison step. The change condition may be used, for example, to change a location based quality of service parameter.

17 Claims, 15 Drawing Sheets

(56) References Cited

U.S. PATENT DOCUMENTS

2007/0036275 A1    2/2007  Bluemche et al.
2013/0046879 A1*  2/2013  Garcia ............... H04L 43/0811
                                                                                      709/224

OTHER PUBLICATIONS

International Search Report and Written Opinion dated Apr. 23, 2014, in International Application No. PCT/SE2013/050994, 12 pages.
Sedlar et al. "Contextualized Monitoring and Root Cause Discover in IPTV Systems Using Data Visualization" IEEE Network, IEEE, vol. 26, No. 6, 2012, pp. 40-46.

* cited by examiner

| Time | Antenna_ID | User_ID |
|---|---|---|
| 01PM | 1066 | 46998 |
| 01PM | 1066 | 46906 |
| 01PM | 1053 | 47004 |
| 01PM | 761 | 46892 |
| 02PM | 341 | 46998 |
| 02PM | 1066 | 46906 |
| 02PM | 545 | 47004 |
| 02PM | 124 | 46892 |
| 02PM | 1053 | 46986 |
| 02PM | 1053 | 47006 |
| 02PM | 1053 | 47050 |
| 02PM | 441 | 46907 |
| 02PM | 36 | 46902 |

Figure 7j

APPARATUS AND METHOD FOR PROCESSING DATA STREAMS IN A COMMUNICATION NETWORK

CROSS REFERENCE TO RELATED APPLICATION(S)

This application is a 35 U.S.C. § 317 National Phase Entry Application from PCT/SE2013/050994, filed Aug. 26, 2013, designating the United States, the disclosure of which is incorporated herein in its entirety by reference.

TECHNICAL FIELD

The present invention relates to an apparatus and method for processing data streams in a communication network, for a telecommunications network.

BACKGROUND

In a communication network such as a telecommunications network, it is desirable to be able to understand the Quality of Service (QoS) being provided to customers. In particular, there is a requirement to determine the QoS being provided to valued (VIP) customers at a specific location, and based on Key Performance Indicators (KPIs) endorse better services and promote new recommendations to such valued customers. This type of information is required by telecommunication network operators, for example in order to provide information for operational support systems (OSS) and business support systems (BSS), so that the telecommunication network operators can serve their loyal customers well.

In this regard, understanding and visualizing the movements of customers to new locations is an interesting analytics operation which the mobile phone operators desire to execute. Traditional approaches do not provide solutions which are fast enough to enable real time operation to be performed, for example for checking the QoS related to valued customers.

Existing solutions are unable to handle large quantities of online transaction data (for example customer call data or cell tower data), and as such are unable to extract any patterns or trends from the data in a meaningful way.

SUMMARY

It is an aim of the present invention to provide a method and apparatus which obviate or reduce at least one or more of the disadvantages mentioned above.

According to a first aspect of the present invention there is provided a method of processing a data stream of a communication network in a distributed processing architecture comprising a plurality of processing units. The method comprises the steps of extracting data from the data stream, wherein the data is extracted for a particular time window of a sliding time window. The extracted data is converted into a format suitable for graphical representation, and then a graphical representation of the converted extracted data generated. An estimated value is determined of at least one structural property of the graphical representation of the data. The estimated value of the at least one structural property is compared with a threshold value, and a change condition reported based on the outcome of the comparison step.

According to another aspect of the present invention there is provided a distributed processing architecture for processing a data stream of a communications network. The distributed processing architecture comprises a first processing unit adapted to extract data from the data stream, wherein the data is extracted for a particular time window of a sliding time window. A second processing unit is adapted to receive the extracted data from the first processing unit, and convert the extracted data into a format suitable for graphical representation. A third processing unit is adapted to generate a graphical representation of the converted extracted data. A fourth processing unit is adapted to determine an estimated value of at least one structural property of the graphical representation of the data, and further adapted to compare the estimated value of the at least one structural property with a threshold value, and report a change condition based on the outcome of the comparison.

BRIEF DESCRIPTION OF THE DRAWINGS

For a better understanding of examples of the present invention, and to show more clearly how the examples may be carried into effect, reference will now be made, by way of example only, to the following drawings in which:

FIGS. 7a to 7j show a further example of a typical application of an embodiment of the invention.

DETAILED DESCRIPTION

The embodiments of the invention, as will be described below, enable data streams to be processed in a real time environment to enable a network node or network operator to obtain detailed network information dynamically, or in real time, such that the detailed network information can be used for various tasks, for example catering for the needs of customers (such as valued customers), or for upgrading their loyalty offerings, or other location based quality of service improvements. It is noted that the results of the data processing can be used for other applications, without departing from the scope of the invention as defined in the appended claims.

In the examples described below the data streams will be described in the context of an application relating to a location specific data stream such as call detail records of a specific place, for example received from a mobile communications operator, or a location specific data stream such as Twitter® data streams related to a specific place, for example from a social network. It is noted, however, that the embodiments of the invention can be used with other types of data streams and other data feeds, or other social networking sites. It is also noted that in the context of social networks, a specific place (location) can be extended from a small geographic area to a specific country, or even the entire world in terms of social networks.

Figure 1:
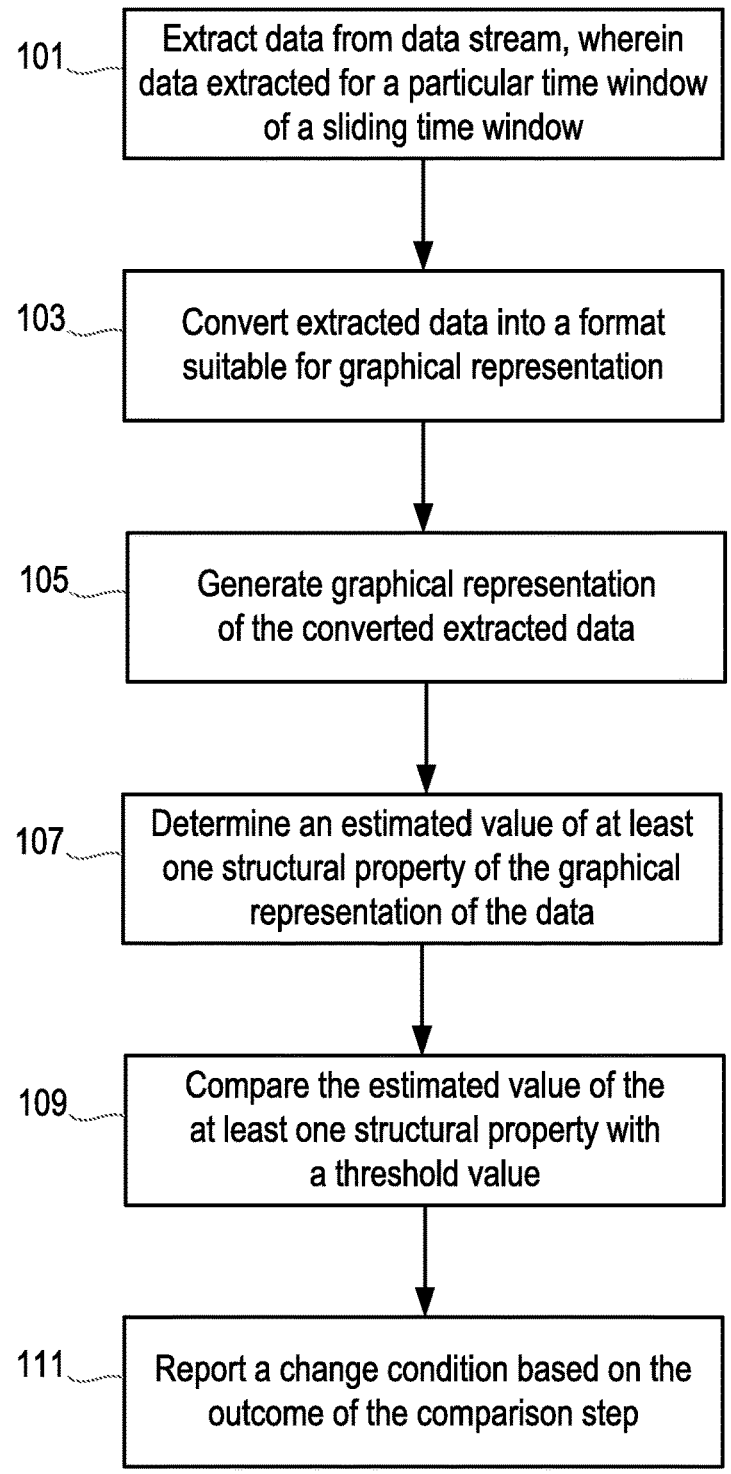
FIG. 1 shows a method according to an embodiment of the invention.

FIG. 1 shows a method according to an embodiment of the invention, for processing a data stream of a communication network in a distributed processing architecture comprising a plurality of processing units. The method comprises the steps of extracting data from the data stream, wherein the data is extracted for a particular time window of a sliding time window, step 101. The extracted data is converted into a format suitable for graphical representation, step 103. It is noted that the exact type of conversion will depend on a particular application (and hence the type of data extracted), and also the type of subsequent processing being performed. For example, the extracted data stream may be converted into a suitable format for generating a graphical representation of the data, or for making a readable file for a specific visualization software, for example Gephi software for generating a graph. A graphical representation of the converted extracted data is then generated, step 105, and an estimated value of at least one structural property of the graphical representation of the data determined, step 107. The estimated value of the at least one structural property is compared with a threshold value, step 109, and a change condition reported, step 111, based on the outcome of the comparison step.

The calculation of structural properties for the graphical representation of the data enable, for example, a disorientation at a particular location to be analysed and understood, based upon the change conditions that are reported. A disorientation can comprise, for example, any form of abnormal condition or situation, or the presence of loyal customers near to a highly transacted cell tower. Disorientation in a social network environment can comprise, for example, an abnormal condition such as the spread of some unwanted news very quickly, which could affect the integrity or security of a country or society, or some individual or company's reputation. It is noted that other forms of disorientation are intended to be embraced by the invention, as defined by the appended claims.

The method steps 101 to 111 described above may be performed in a plurality of different processing units of the distributed processing architecture. For example, according to one embodiment each of the steps is performed in a separate processing unit. According to another example steps 107 to 111 are performed in the same processing unit, while the other steps are performed in separate processing units.

The embodiments of the invention enable large data sets to be handled dynamically in real time by the manner in which different processing units act on the data extracted from the sliding time window in a sequential manner, but also due to the manner in which the extracted data is represented graphically, such that at least one structural property can be determined and then compared with a threshold value in order to trigger a change condition (for example by generating an alarm condition), which can be used to automatically alert a network operator that action may be needed, and/or automatically change one or more parameters of the communication network.

Furthermore, by generating a graphical representation of the extracted data, this enables a visualization of the data streams to be provided, thus aiding network operators from a visual sense, in addition to the automatic monitoring of change conditions noted above. The generation of graphs is sometimes referred to as a "Graph Stream". Due to the large volume of data that is available in a data stream of a telecommunications network, the representation of such data using graphs can help one to visualize and understand about the evolving nature of the data streams over a period of time. Many large web and communication network applications create data streams which can be represented as a sequential stream of edges in a social graph. For example, conversations (such as Voice Calls or SMS messages) in a telecommunication network, or messages in a mobile telecommunications network can be represented as a large stream of edges in a social graph representation. Such streams are typically very large, because of the large amount of underlying activity in such networks.

The embodiments of the invention provide a graphical representation or visualization of data streams in a distributed environment, such that processing units and/or network operators can process the large data streams in a real-time manner.

Figure 2:
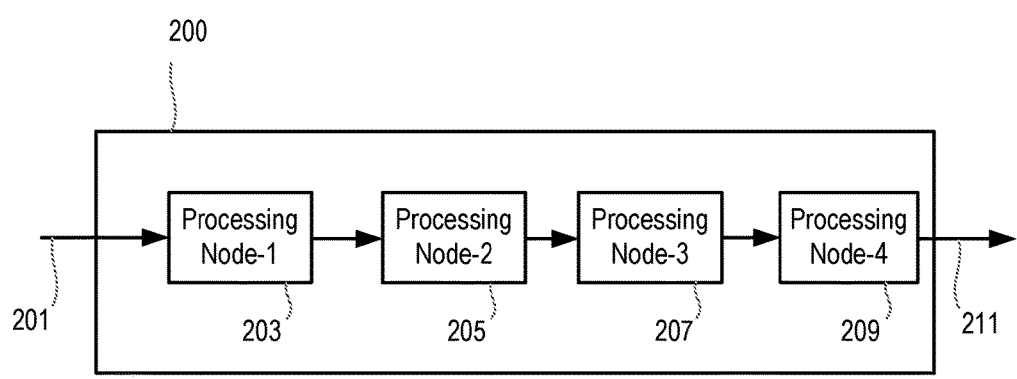
FIG. 2 shows an apparatus according to an embodiment of the invention.

FIG. 2 shows a distributed processing architecture 200 for processing a data stream 201 of a communications network, according to an embodiment of the invention. The distributed processing architecture 200 comprises a first processing unit 203 adapted to extract data from the data stream 201. The data is extracted for a particular time window of a sliding time window. A second processing unit 205 is adapted to receive the extracted data from the first processing unit, and convert the extracted data into a format suitable for graphical representation. A third processing unit 207 is adapted to generate a graphical representation of the converted extracted data. As will be explained later in the application, this may involve processing by the third processing unit 207 alone, and/or processing by another processing entity (not shown). A fourth processing unit 209 is adapted to determine an estimated value of at least one structural property of the graphical representation of the data. The fourth processing unit 209 is further adapted to compare the estimated value of the at least one structural property with a threshold value, and report a change condition 211 based on the outcome of the comparison.

It is noted that one or more of the processing tasks described above may be combined for processing by another processing unit of the distributed processing architecture, and/or separated for processing by separate processing units. For example, the steps performed by the fourth processing unit 209 may be separated and processed by different processing units. Each of the plurality of processing units may process data in parallel based on load, and each processing unit may be split into a plurality of different processing units to execute a task.

The data streams being processed may comprise customer or cell tower data, for example. The embodiments enable the data streams to be processed such that the method and apparatus can allow change conditions (or alarm conditions) to be detected and reported automatically, but while also providing the data in a manner such that network operators can visualize the findings from real-time streams, thereby providing an opportunity for the operators to perform better services to their valued customers.

According to one embodiment this may be provided using a topology that comprises a distributed storm framework that consists of various built-in components that are configured to accept the data stream, process it and visualize the same in the form of graphs. The data from the data stream is extracted by means of a sliding time window mechanism and passed on to the subsequent components present in the topology. The data thus moves through the topology in a sequential manner from one component or processing unit to another.

A storm framework provides a set of general primitives for performing distributed real-time computation, and can be used for "stream processing", by processing regular messages and updating databases on a real-time basis. Thus, in an embodiment using storm processing there is provided a distributed processing architecture that is used for continuous computation, whereby a continuous query is performed on the data streams, with the results being streamed out to users as they are computed. Storm terminology will be familiar to a person skilled in the art, and includes terminology such as Streams, Spouts, Bolts, Tasks, Workers, Stream Groupings, and Topologies. As an alternative to using storm, embodiments of the invention may process the data by managing clusters of queues and workers. Such an example involves sequential processing which processes data through the techniques of managing a plurality of clusters of systems with queues and workers as a processing node.

According to one embodiment, the step of generating a graphical representation of the extracted data may comprise the step of interfacing with a graphical visualization unit to generate the graphical representation of the data, for example a graphical visualization unit that is adapted to process a Gephi® application, as will be described later in the application.

Gephi is an open-source network analysis and visualization software package written in Java. The goal of this tool is to help data analysts to make hypothesis, intuitively discover patterns, and isolate structure singularities or faults during data sourcing. It is a complementary tool to traditional statistics, as visual thinking with interactive interfaces is now recognized to facilitate reasoning. The main profit from this fast graph visualization engine is to speed-up understanding and pattern discovery in large graphs.

The method performed by the embodiment of FIG. 1 comprises the step of determining an estimated value of at least one structural property of the graphical representation of the data, for example a graphical representation generated using Gephi. An explanation will now be provided of examples of the at least one structural property that can be used by embodiments of the invention. It is noted that other structural properties may also be used, without departing from the scope of the invention as defined in the appended claims.

A graphical representation of the data comprises a set of vertices (V) and a set of edges (E) between the set of vertices, and wherein an edge ($E_{ij}$) connects a first vertex ($V_i$) with a second vertex ($V_j$). In a communication network the vertices may represent nodes of the communication network, or represent users in the communication network, with edges representing links between such nodes or users.

A first example of a structural property comprises an average path length value, $I_G$, relating to the average number of steps along the shortest paths for all possible pairs of first and second vertices.

The average path length value $I_G$ provides a measure of the efficiency of information or mass transport on a network. Consider a graphical representation of data G, having a set of vertices V. Let d(v1,v2), where (v1,v2 $\in$V), denote the shortest distance between vertices v1 and v2. Assume that d(v1,v2)=0 if v1=v2 or v2 cannot be reached from v1. Then, the average path length $I_G$ is determined as:

$$I_G = \Sigma d(v_i, v_j)/(n \cdot (n-1)),$$

where n is the number of vertices in the graphical representation G of the data. A second example of a structural property comprises a connected component count value, relating to a sub-graphical representation of the graphical representation of the data, in which any two vertices are connected to each other by paths, and which is connected to no additional vertices in the main graphical representation. In other words, in graph theory a connected component of an undirected graph is a sub-graph in which any two vertices are connected to each other by paths, and which is connected to no additional vertices in the main graph. The number of connected components is an important topological invariant of a graph.

A third example of a structural property comprises an average clustering coefficient value, each clustering coefficient value providing an indication regarding the degree to which vertices (or nodes) in a graph tend to cluster together.

Each clustering coefficient is therefore a measure of the degree to which nodes in a graph tend to cluster together. In most real-world networks, for example mobile phone networks and social networks, nodes tend to create tightly knit groups characterised by a relatively high density of ties; this likelihood tends to be greater than the average probability of a tie randomly established between two nodes. This property is calculated for the generated graphical representation of the data, for example using a Gephi toolkit. As mentioned above, a graphical representation of data, G=(V,E), formally consists of a set of vertices V and a set of edges E between them. An edge $e_{ij}$ connects vertex $v_i$ with vertex $v_j$. The neighbourhood $N_i$ for a vertex $v_i$ is defined as its immediately connected neighbours as follows:

$$N_i = \{v_j : e_{ij} \in E \char`\^ e_{ji} \in E\}$$

Where $k_i$ is defined as the number of vertices, $|N_i|$, in the neighbourhood, $N_i$, of a vertex, then the clustering coefficient is given as:

$$C_i = |\{e_{jk} : v_j, V_k \in N_i, e_{jk} \in E\}|/(k_i(k_i-1))$$

The clustering coefficient for the whole network AC is given as the average of the clustering coefficients of all the vertices n:

$$AC = \Sigma C_i/n$$

A fourth example of a structural property comprises an average degree value, relating to the number of edges in a set of edges E in comparison to the number of vertices in the set of vertices V.

The average degree of a graph G=(V, E) is therefore a measure of how many edges are in set E compared to number of vertices in set V. Because each edge is incident to two vertices and counts in the degree of both vertices, the average degree of an undirected graph is 2*|E|/|V|.

A fifth example of a structural property comprises a graph density value, relating to a measure of how many edges are in a set of edges E compared to a maximum possible number of edges between vertices is the set of vertices V. Thus, the density of a graph G=(V, E) measures how many edges are in set E compared to the maximum possible number of edges between vertices in set V. A directed graph can have at most |V|*(|V|−1) edges, so the density of a directed graph is:

$$|E|/(|V|*(|V|-1)).$$

A sixth example of a structural property is a modularity value, relating to a measure of the strength of division of a graph into modules. Modularity is one measure of the structure of graphs. It is used to measure the strength of division of a graph into modules (also called groups, clusters or communities). Graphs with high modularity have dense connections between the nodes within modules but sparse connections between nodes in different modules. Modularity is often used in optimization methods for detecting community structure in graphs. A formulation of the modularity, is as follows. Define $S_{ir}$ to be 1 if vertex i belongs to group r and zero otherwise. Then $$\delta(c_i c_j) = \Sigma S_{ir} S_{jr}$$

and hence $$Q = \Sigma\Sigma[A_{ij}-(k_i k_j/2m)]S_{ir} S_{jr}$$

where S is the (non-square) matrix having elements $S_{ir}$ and B is the so-called modularity matrix, which has elements $$B_{ij}=A_{ij}-(k_ik_j/2M)$$

All rows and columns of the modularity matrix sum to zero, which means that the modularity of an undivided network is also always zero.

A seventh example of a structural property is an average weighted degree value, relating to an average of the sum of weights of the edges of the nodes. This structural property possesses a higher estimated value obtained through regression analysis, and hence serves as a discriminant to detect the possible occurrence of disorientations.

It is noted that an estimated value of a structural property of the graphical representation of the data, according to embodiments of the invention, may comprise any one or more of the examples described above.

For example, according to one embodiment, estimated values relating to two or more structural properties are combined to provide a single aggregated estimated value, the single aggregated estimated value being compared with the threshold value.

By having the values of different structural properties aggregated into one estimated value, this allows a simple comparison to be made with just one threshold value, and can therefore have the advantage of reducing the complexity of data processing. Thus, in an application using this format, the system can be configured to select which combination of structural properties would be best suited to monitor a particular aspect in the communications network, with the estimated values for the selected structural properties then being aggregated or combined into one single estimated value. The single estimated value (representing a plurality of separate estimated values for the various structural properties) is then compared during use with a single threshold value, in order to detect a change condition or alarm condition relating to the communications network being monitored. The threshold value may itself have been formed using historical data (either from an initialization phase or on-the-fly during use), and whereby estimated values for similar or the same structural properties are aggregated to form the threshold value. As such, during use a single estimated value representing at least one structural property is compared with a threshold value, which itself represents a corresponding at least one structural property.

According to an alternative embodiment, an estimated value of a particular structural property may be compared with a respective threshold value for that respective structural property. In such an embodiment each estimated value relating to a structural property is compared with its own threshold value, rather than aggregating them first as described in the section above. Thus, in such an embodiment an estimated value of a single structural property alone can be sufficient to indicate a disorientation for generating a change condition (or alarm).

The threshold value may be determined during an initialization phase of operation. The initialization phase of operation may comprise the steps of: retrieving a data stream relating to historical data; generating a graphical representation of the historical data; determining an estimated value for one or more structural properties of the graphical representation of the historical data; and analysing the estimated value of the one or more structural properties to generate the threshold value.

According to one embodiment the method further comprises the step of updating the threshold value during use, by periodically performing the steps outlined above using more recent historical data, thereby adjusting the threshold value dynamically during use. This has the advantage of making the system as dynamic as possible to accommodate the evolving nature of the data stream being processed.

Further details will now be provided about the different phases of operation of the embodiments of the invention, and in particular an initialization phase (or offline phase) and an online phase.

Figure 3:
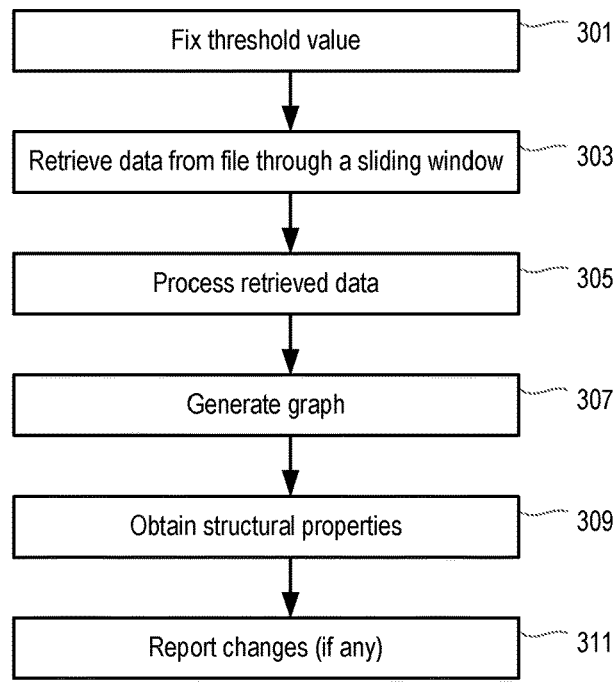
FIG. 3 shows a method according to another embodiment of the invention.

Referring to FIG. 3, a method according to an embodiment of the invention describes the steps performed during an offline or initialization stage, whereby historical data or training data is used to determine or fix an initial threshold value (or values).

The method comprises the step of fixing the threshold value, step 301. This may comprise, during a first phase of study, processing for fixed time slots location specific data that has been stored offline in a database. Thus, in step 303 data is retrieved through a sliding time window. The data stored offline may comprise test data or historical data from the past. The time slots used during this offline mode may correspond to similar time slots as those used during online operation, although it is noted that data from subsequent time slots may also be used for the calculations performed during the offline or initialization phase.

The training data set or historical data may contain, for example, details of the earlier movements of customers and the related transactions (for example call detail records such as SMS, voice calls, data usage, etc.). This data is processed in step 305, for example converted into a format suitable for graphical representation, and represented in the form of a graph, step 307. At least one or more structural properties are chosen to detect changes, and the at least one structural property obtained in step 309. Therefore, during the set-up phase, the system is effectively being configured to determine which one or more structural properties are going to be used to provide the comparisons which will later be made during the online or real time analysis, for example based on which one or more structural properties have previously led to a disorientation at a specific location. It is noted that which structural properties to select will depend upon a particular application, based on which structural properties are more useful than others once the graphical representation is analysed.

The obtained structural property (or properties) are compared with the threshold value (or values) in order to detect possible occurrences of changes in the system, and any changes reported in step 311.

Thus, one purpose of this offline implementation shown in the embodiment of FIG. 3 is to understand the nature of the data so as to determine the threshold for the structural properties to efficiently detect changes in an online real-time implementation.

Figure 4:
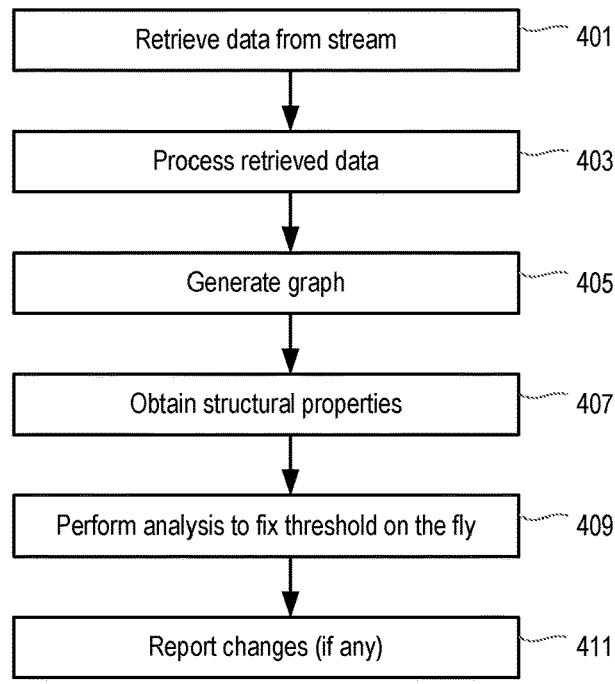
FIG. 4 shows a method according to another embodiment of the invention.

According to another embodiment shown in FIG. 4, a threshold value (or threshold values) may be determined on-the-fly during online or real-time implementation. In such an embodiment the threshold values may be continuously updated based on the results of offline processing, thereby providing updated knowledge, as will be explained in further detail below.

In step 401 data is retrieved or extracted from a data stream, for example using a sliding time window such that data from the stream is passed in real-time through a sliding time window mechanism.

The retrieved data is then processed in step 403, for example converted into a different format, and a location-specific graph generated in step 405. Then, one or more structural properties of the graph are obtained and calculated, step 407. The one or more structural properties are compared with the threshold value obtained by performing an analysis on past values, step 409, such that the threshold value can be fixed on-the-fly to make the system as dynamic as possible, to accommodate the evolving nature of the data stream. This process therefore checks, for example, the QoS of valued customers present in the specific location, with changes detected and reported in step 411, and may be recorded whenever the current value exceeds the threshold value.

It is noted that the determination of a threshold value (or values) during an initialization stage (as shown in FIG. 3) and the determination of a threshold value (or values) on-the-fly (as shown in FIG. 4) may be associated or used in the same system.

Figure 5:
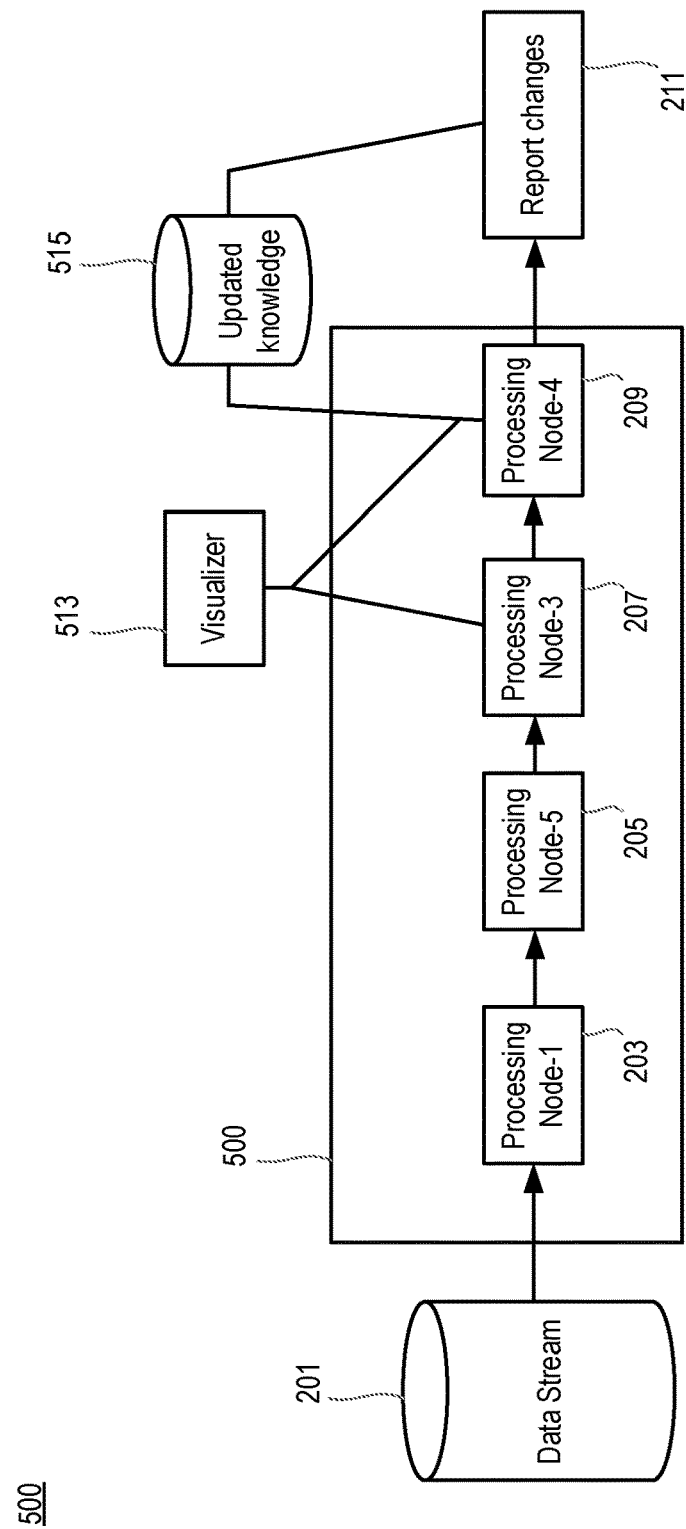
FIG. 5 shows an apparatus according to an embodiment of the invention.

FIG. 5 shows a distributed processing architecture 500 according to another embodiment of the present invention. A first processing unit 203 retrieves or extracts data from a data stream 201 using a sliding time window, which is passed to a second processing unit 205 of the distributed framework. The second processing unit 205 is adapted to convert the extracted data, such that it is transformed into a suitable file format that is best suited for use by a subsequent processing node, i.e. processing unit 207 in this example. Thus, the second processing unit 205 is configured to receive the extracted data from the first processing unit 203, and convert or transform the extracted data into a format suitable for graphical representation.

The third processing unit 207 is adapted to generate a graphical representation of the converted extracted data. The third processing unit 207 is configured in this embodiment to interface with a graphical visualization unit 513 when generating the graphical representation of the extracted data. The second processing unit 205 will have converted the data into a format which is best suited for importation into the graphical visualization unit 513 for visualization purposes. For example, the extracted streaming data may be converted into a suitable format for generating a graphical representation of the data, or for making a readable file for a specific visualization software, for example Gephi software for generating a graph, and can involve, for example, converting the data into ".net" type data files.

A fourth processing node 209 is adapted to determine at least one structural property for the graphical representation that has been generated by the third processing unit 207 (the third processing unit possibly having the assistance of the visualization unit 513), and further adapted to aggregate the at least one structural property into a single estimated value based on an analysis (for example regression or prediction analysis), in order to be compared with a dynamic threshold value obtained through an analysis on the past data (which is stored in an updated knowledge base 515) to detect the possible presence of changes 211 in a system. It is noted that the steps performed by a particular processing node, for example the steps performed by node 209, may be split for processing by separate nodes, if desired. The at least one structural property may comprise one or more of the structural properties described earlier in the application, or another structural property of the graphical representation.

From the above it can be seen that each data stream generated from one single location is processed on a sliding time window and then sent to a graphical visualization unit 513 that is interfaced with the distributed framework to visualize the data in the form of a graph. The same process can be applied for multiple locations to track and provide intended QoS of other users (such as other valued customers).

The subsequent processing units obtain the structural properties of the generated graph to arrive at a single aggregated value based on a prediction or regression analysis. This may be performed by analyzing test data that assigns a specific estimate for each of the types of structural property, so as to be compared with a threshold value to detect the possible occurrence of changes in the system and activate alarms. To make the threshold value more dynamic, the apparatus can be adapted to periodically perform an analysis on the past data, for example more historic data, to fix the threshold values on-the-fly.

It can be seen from the embodiments above that the system takes an input data stream, for example from charging/billing nodes, and feeds the data to a distributed processing architecture or framework. The stream data is read (or extracted or retrieved) through a first processing node and passed on to subsequent processing nodes in the framework. A subsequent processing node may be a node which processes the obtained data to transform the data into a suitable file format that can be imported into a graphical visualization unit 513 (for example GEPHI®) for visualization purpose. One of the subsequent processing nodes, the third processing node 207 of the examples above, interfaces the graphical visualization unit 513 with the distributed framework to generate the corresponding graph of the processed data obtained from the first and second processing nodes. The structural properties obtained for the generated graph by a fourth processing unit 209 are aggregated into a single estimated value based on predictive analysis in order to be compared with a threshold value (for example a dynamic threshold value) obtained through an analysis on past or historical data (which is stored in an updated knowledge base 515) to detect the possible occurrence of changes in the system. The occurrence of changes in the system is reported as a change condition or alarm condition 211 to a stakeholder. For example, an alarm may be reported through an alarm agent used in the OSS/BSS system. This alarm indicates the changes for which action needs to be taken immediately. This is illustrated by the example shown in FIG. 6.

Figure 6:
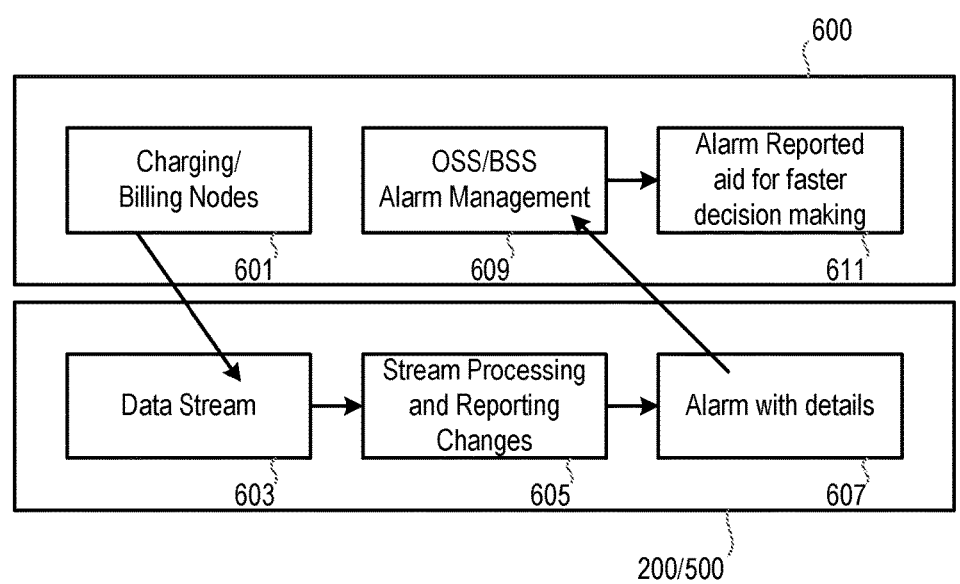
FIG. 6 shows a typical application of an embodiment of the invention.

FIG. 6 shows an example of how an embodiment of the invention may be used to generate a change condition or an alarm condition. The section labeled 600 relates to elements of a conventional telecommunications system, while the section labeled 200/500 relates to a distributed processing architecture according to embodiments of the invention.

Charging or billing nodes 601 generate a data stream, which is retrieved or extracted by a node 603 of the distributed processing architecture 200/500. The module 605 is adapted to process the extracted data stream, for example using the techniques described in the embodiments above, and report changes that are detected via this monitoring, in order to generate an alarm signal 607 and its corresponding details. An alarm signal can be used, for example, to prompt end users, and to indicate a disorientation at a particular location, such that further action can be taken. For example, a network operator usually knows about the occurrence of huge events at a specific location at a particular time of day. Network operators need to react if their loyal customers are present at that location at that time (for example to provide better quality of service to their most loyal or influential customers). The embodiments of the invention therefore enable a change condition or alarm signal to be generated, to indicate the presence of loyal customers at a specific location to the network operators, such that the network operators can take immediate action to provide a better quality of service to their customers.

The alarm signal may be used by an operational support systems (OSS) and/or business support systems (OSS/BSS) 609, to generate a report of an alarm 611, which can aid such faster decision making (or consequential action).

As mentioned above the embodiments of the invention may be used in a variety of applications. A first example will now be described in the context of call data, and in particular the steps involved in analysing call detail records (CDR) of mobile phone customers and tower data streams.

From the CDR and cell tower data streams, the input consists of the corresponding call detail records for a time window of a sliding time window, for example the current hour, with the call detail records comprising fields such as: locality, sub-locality, timestamp, originating antenna id, terminating antenna id, total number of calls shared between the antennae during the current hour and valued customer call and mobility details The data stream, for example the current hour's CDR data stream, is processed to generate a corresponding ".net" file that labels all the nodes and marks edges with the labelled nodes, and the weight of the edge being equated to the total number of calls shared between the antennae. Next, the generated ".net" file is imported into a graphical visualization unit so that a graphical representation of the data for the current hour can be generated.

The generated graphical representation is then analysed to obtain its structural properties (for example one or more structural properties) and hence form a single aggregated value by combining the values of the different one or more structural properties, with prediction analysis being used to check whether the single aggregated value is within a threshold value. If the current value exceeds the threshold, then the changes are reported. The changes may be reported along with the unique identifier (ID) of a sub-set of customers, for example the loyal customers (most influential users in the network), who get affected due to the available QoS at that current timing.

This report can be used by the service providers to perform efficient load balancing in a specific location in order to deal with the changes, and thus provide better services to the valued customers. These steps are executed in a real-time distributed framework that is integrated with a visualization unit for visualizing the data streams.

It is noted that in another example application, the embodiments of the invention may be used to find out a disorientation in social network data, for example in a Twitter social network. As noted above, a disorientation can comprise, for example, any form of abnormal condition or situation, or the presence of loyal customers near to a highly transacted cell tower. Disorientation in a social network environment can comprise, for example, an abnormal condition such as the spread of some unwanted news very quickly, which could affect the integrity or security of a country or society, or some individual or company's reputation. It is noted that other forms of disorientation are intended to be embraced by the invention, as defined by the appended claims.

According to one example the embodiments of the present invention may be used in an application that provides sentiment analysis for social network data, for example when analyzing data streams from a social network such as Twitter.

Sentiment analysis or opinion mining refers to the application of natural language processing, computational linguistics and text analytics to identify and extract subjective information in source materials. In one embodiment, a model such as a AFINN model (AFINN being an affective lexicon by Finn Arup Nielsen) can be used that lists various words and phrases rated for valence with an integer between −5 and +5, where −5 denotes the one with the most negative sentiment and +5, the most positive sentiment. Thus, this process can be used by embodiments of the invention in the analysis of the sentiment of a tweet in a Twitter data stream.

The steps involved in a Twitter data stream analysis are explained further below. The location specific tweets through the Twitter Search API are retrieved and passed on to the underlying component in the distributed processing topology. The retrieved tweets may be processed to remove certain words, for example stop words such as "a, an, the, those" etc., and then categorized based on the keywords present. The categories may comprise, for example, categories relating to a number of topics such as "Music, Sports, Politics and Others". Then, further analyses is performed on the sentiment of the keywords by grouping them as "happy or sad" by the use of a sentiment analysis model. The categorized specific location tweets can be transformed into a ".net" file to import into the graphical visualization unit for graph generation purpose. In the user graph generated for each category, the nodes represent the users and the edges, the total number of tweets shared between the users. The generated user graph can then be analyzed to obtain its structural properties, and thereby performing a regression analysis to check for the possible presence of a disorientation. Thus, this process is run in a parallelized real-time distributed framework interfaced with a visualizer by visualizing the twitter data stream.

Next, in relation to FIGS. 7a to 7j there will be described the results of an example of an application relating to the use of mobile phone customers' data stream using the distributed Storm framework and Gephi toolkit. In the example the regression analysis on the training data set resulted in the following equation:

$$\text{Estimated Value} = 0.775 * \text{AverageWeightedDegree} + 1.166 * \text{AveragePathLength} - 1.127 * \text{Modularity} + 0.658 * \text{ConnectedComponentsCount} - 0.380 * \text{AverageClusteringCoefficient} + 0.343 * \text{AverageDegree}$$

In the above the estimated value represents an example of a disorientation that has happened in one situation, where coefficients denote the constants calculated and the estimated value refers to the abnormal value that is compared to the regular threshold value.

From the visualized graphs shown in FIGS. 7a to 7i there can be seen the evolving nature of the data streams in real time. The threshold value was fixed dynamically on-the-fly. Thus, the evolution of CDR data stream is traced by visualizing the same for each hour by means of a graph. Graphs 7a to 7i show the graphs at time windows corresponding to 12 am, 01 am, 04 am, 06 am, 10 am, 12 pm, 1 pm, 2 pm and 3 pm, respectively. The sizes of the various nodes are used to rank "centrality" (for example in FIG. 7a the node 701 therefore being more central than node 703), while different shading is used to show "modularity". The thickness of the edge determines how strong the link between the nodes is (for example, in FIG. 7a the link 705 between nodes 707 and 709 is stronger than the link 711 between nodes 707 and 701). In the given data set, disorientations were found at 1 PM (FIG. 7g), 2 PM (FIG. 7h) and 3 PM (FIG. 7i) for the given CDR data stream, and these disorientations would have been reported as change conditions or alarms, such that necessary actions can be taken, for example load balancing. The disorientations may be detected at these times by comparing the estimated value for the structural properties of these graphs with the threshold value (i.e. an aggregated estimated value based on the structural properties noted in an equation as shown on the previous page), with the aggregated estimated value exceeded the threshold value in the graphs for 1 pm, 2 pm and 3 pm. A disorientation is therefore detected as a change in the estimated value, when the estimated value goes above the threshold value. Calculation of the estimated value is based on the changes in each graphical (structural) property.

After finding out the occurrence of a disorientation, the overloaded antennae involved can be identified and a list of users (for example loyal customers) who are using those particular antennae can also be generated, as illustrated in FIG. 7j, to aid a service provider in taking out necessary actions.

As such, according to such an embodiment the data stream is location specific, and the step of reporting a change condition can further comprise the steps of determining one or more overloaded antennae associated with the specific location involved, identifying a sub-set of users that are operationally coupled to the one or more overloaded antennae, and changing a service parameter of at least one of the identified sub-set of users. The step of changing a service parameter may comprise the step of performing a location-based quality of service change.

It is noted that the application relating to the second-use case, i.e. the social network example described above, can be implemented in a similar way to report on disorientations.

Figure 7A:
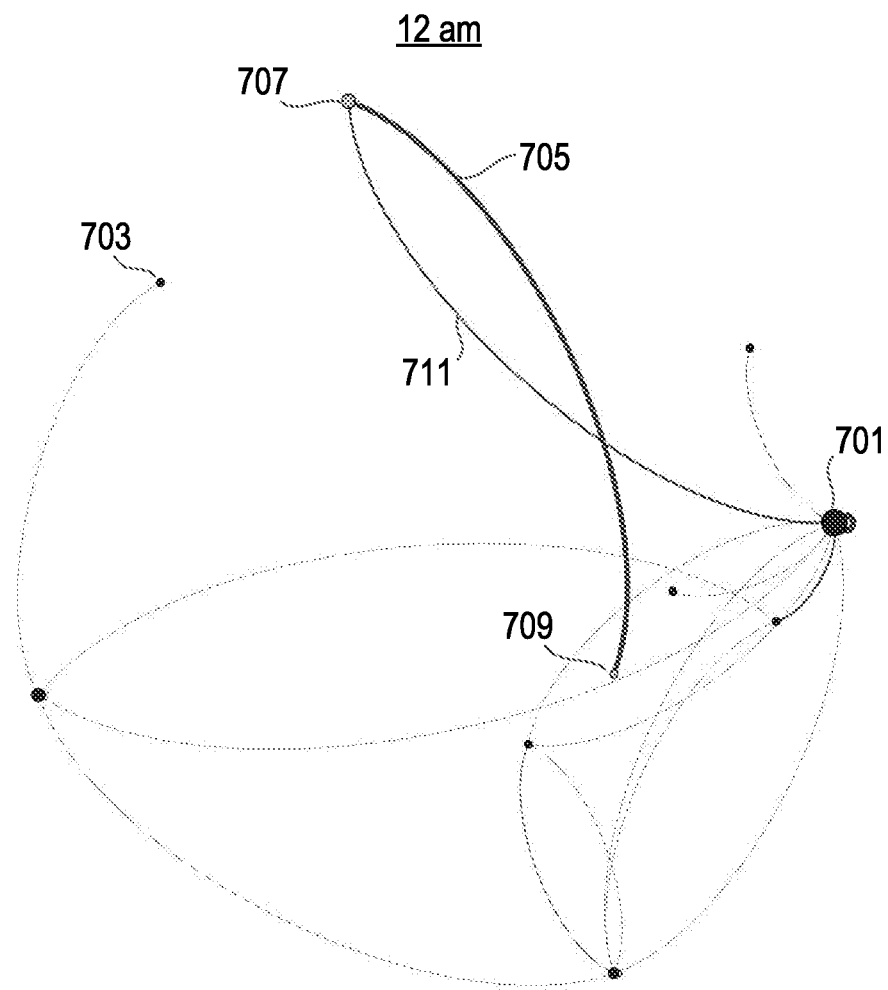
Figure 7B:
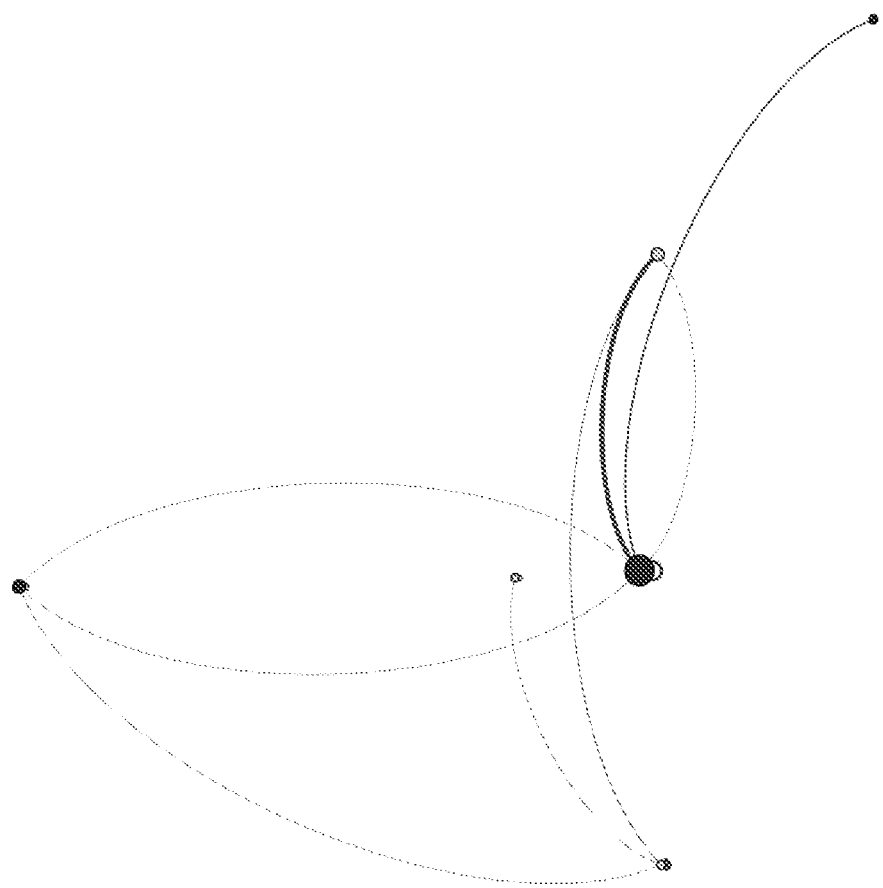
Figure 7C:
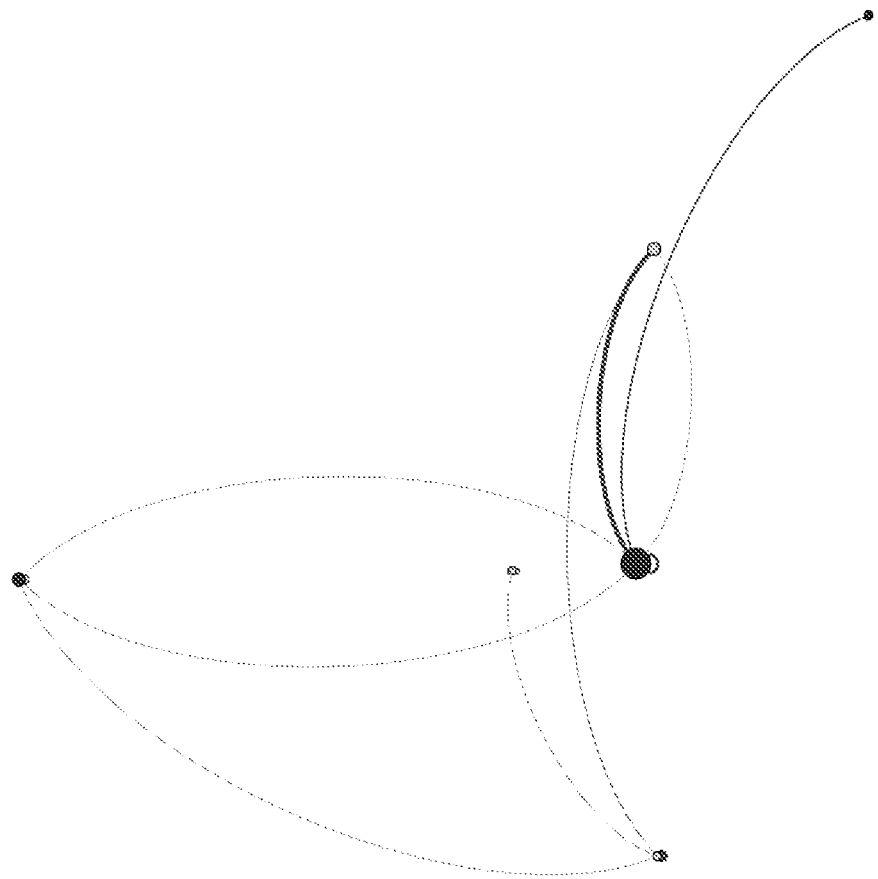
Figure 7D:
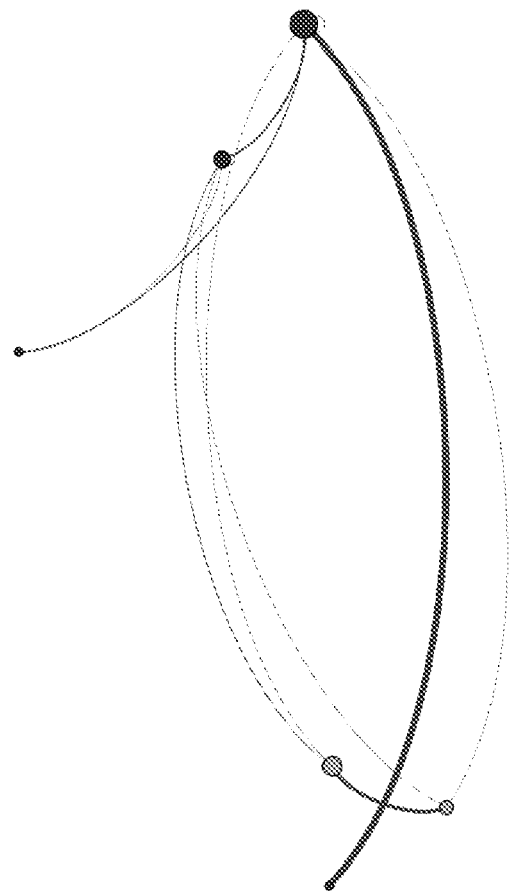
Figure 7E:
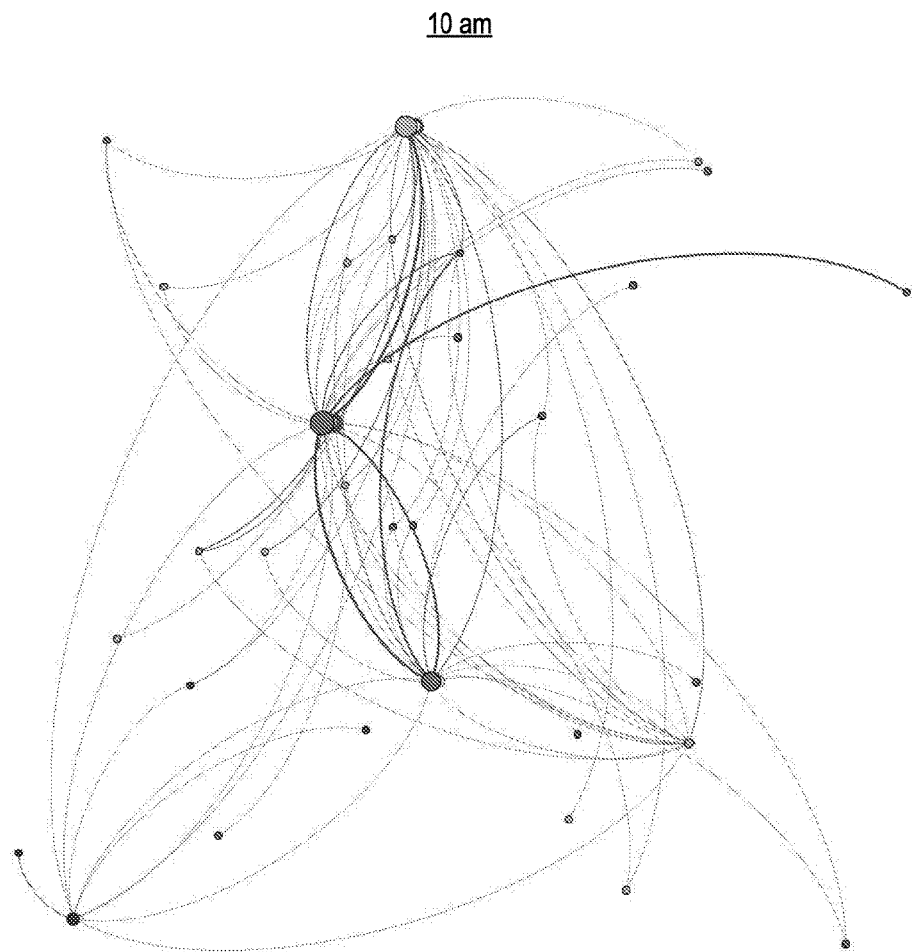
Figure 7F:
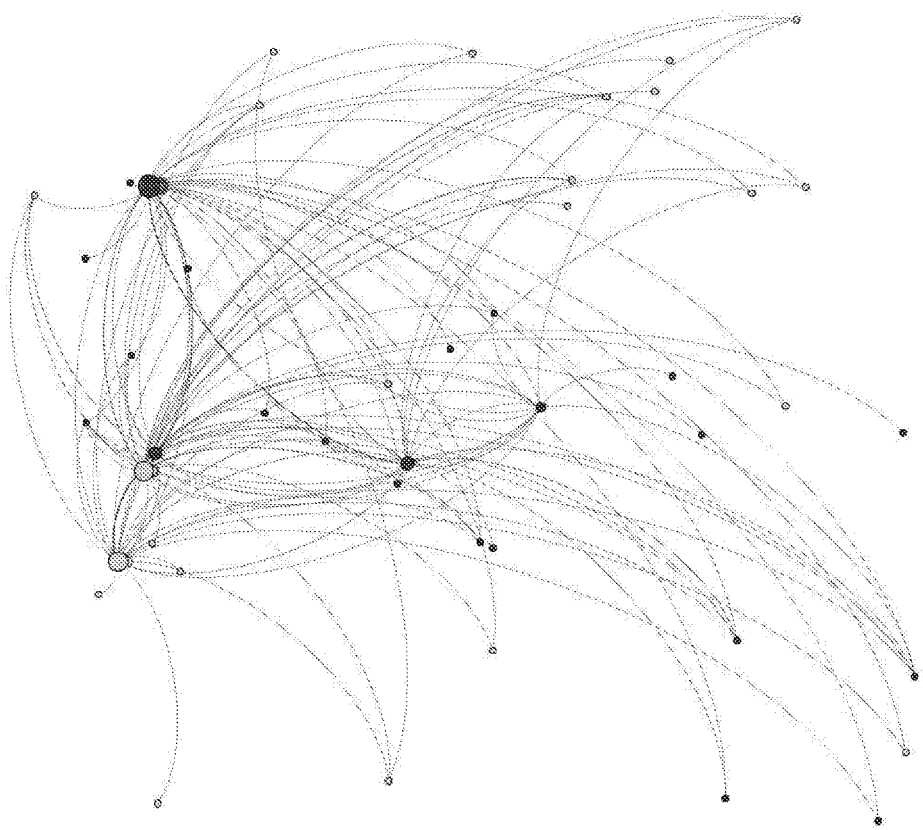
Figure 7G:
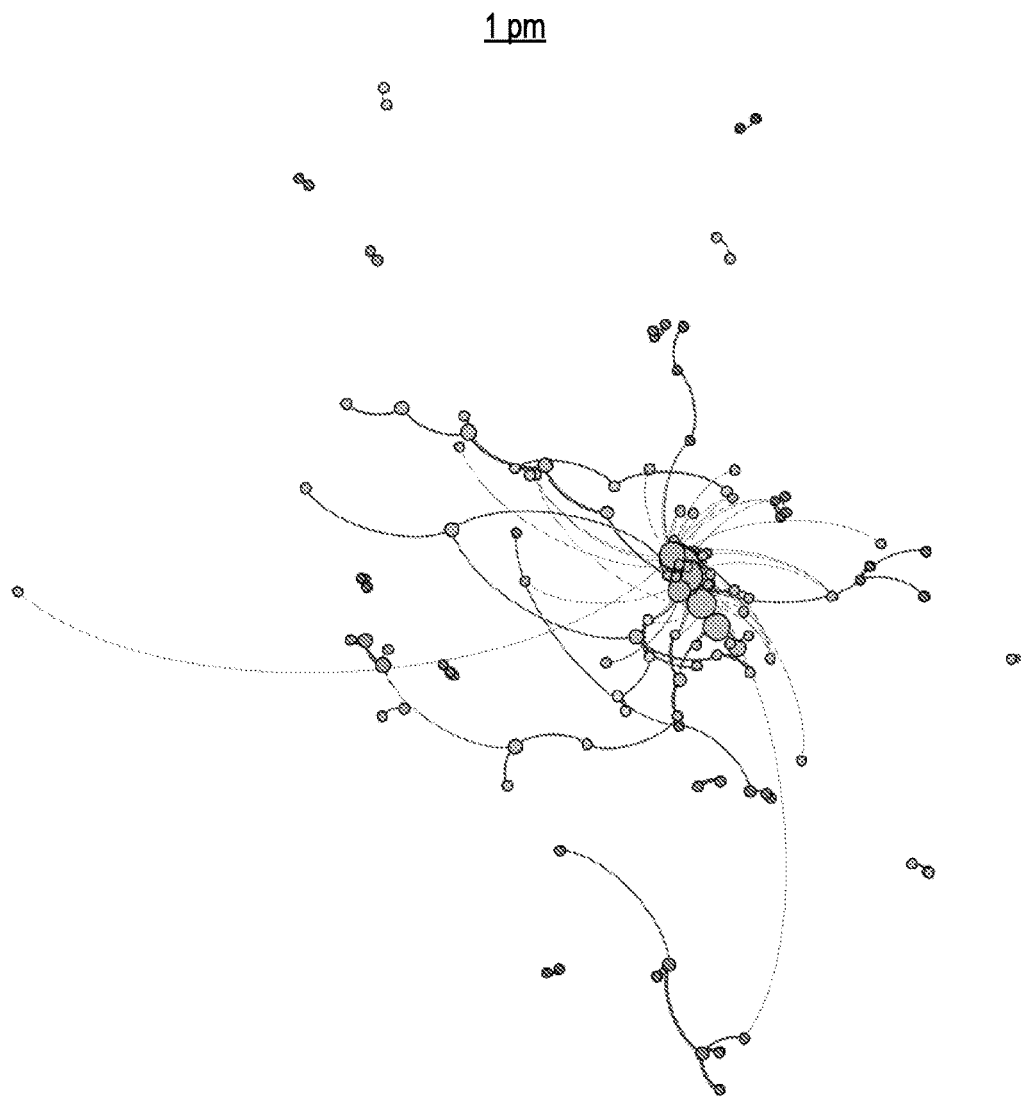
Figure 7H:
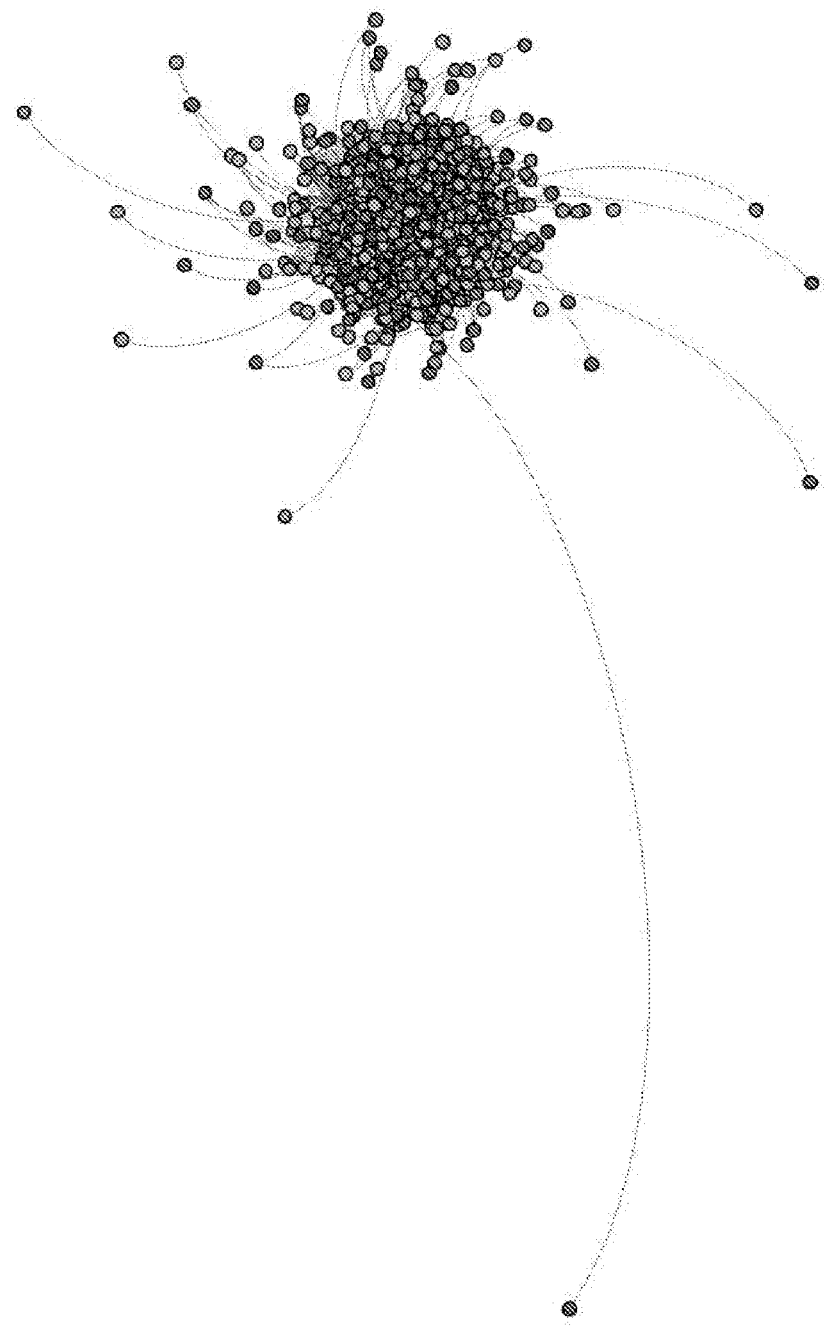
Figure 7I:
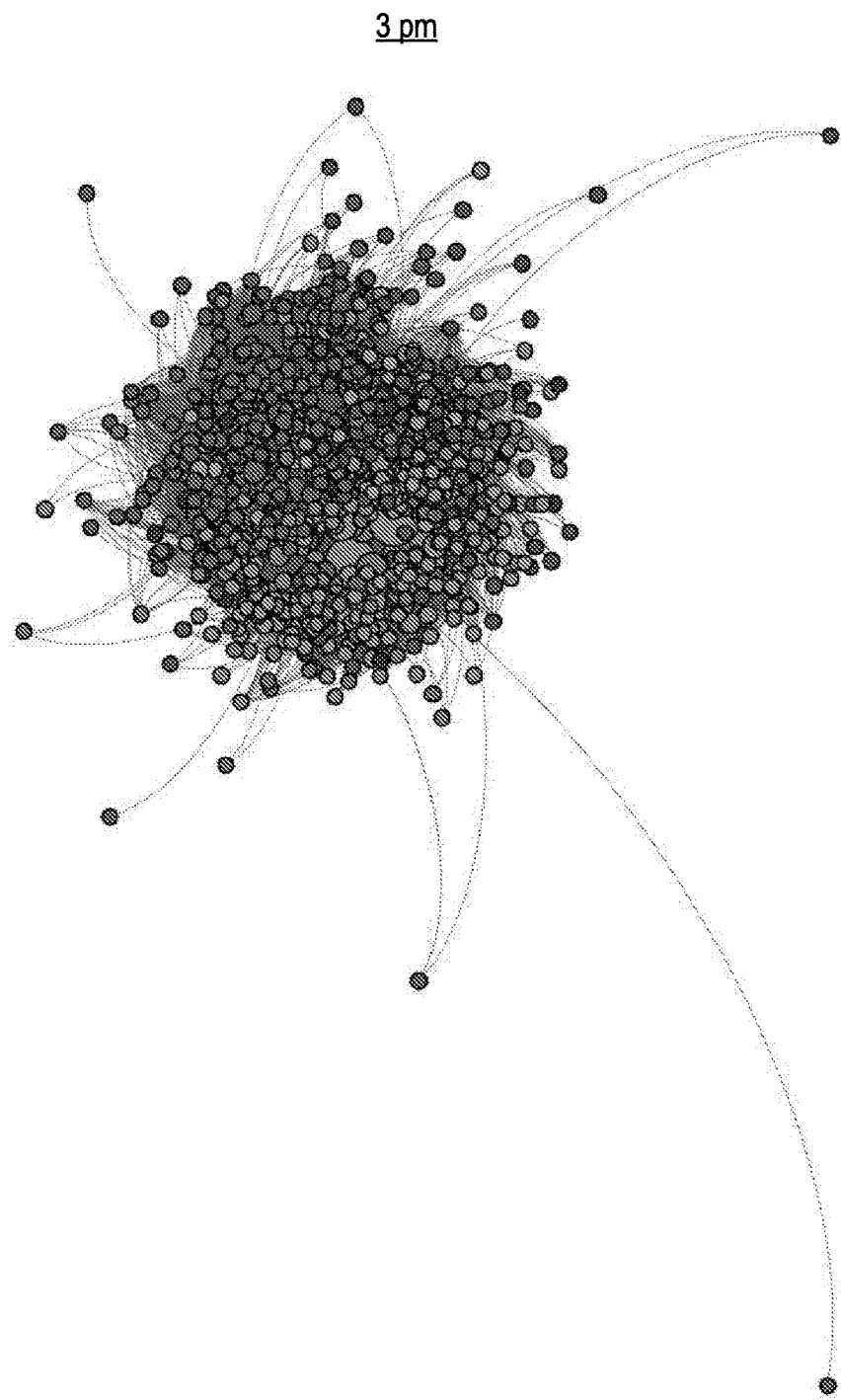

Thus, from FIGS. 7a to 7i it can be seen that graphical representations with no changes are sparser in nature while on the contrary, graphs with changes are denser, while FIG. 7j shows a list of most influential users connected to each antenna. This list can be used by service provider to take the necessary actions.

The embodiments of the invention provide an approach that integrates the distributed framework and a visualizer to visualize large streams of data by constructing graphs. The embodiments have been implemented with the capability to visualize the location specific CDR data stream in the form of graphs in a real-time distributed environment, for example to automatically or dynamically detect changes without affecting the loyal customers through load balancing.

Since a visual approach has been introduced through the generation of graphs, the spread of topics in a given location and the severity can be easily identified and used to avoid disorientation, and this can be used for other social networking research purposes.

It can be seen that each data stream generated from one single location is processed on a sliding time window and then sent to a visualizer that is interfaced with the distributed framework to visualize the data in the form of a graph. The same process can be applied for multiple locations to track and provide intended QoS of the other valued customer's. The subsequent component (processing nodes) obtain the structural properties of the generated graph to arrive at a single aggregated value based on the prediction method. This may be performed by analyzing the test data that assigns a specific coefficient for each structural property, so as to be compared with a threshold value to detect the possible occurrence of changes in the system and activate alarms. To make the threshold value more dynamic, the system may be configured to periodically perform an analysis on the past data to fix the threshold values on-the-fly (which may involve some offline processing).

The embodiments of the invention described above provide a distributed framework having an integrated visualization unit, for visualizing large streams of data by constructing social graphs on different time windows.

The embodiments of the invention provide the capability to visualize the location specific data stream in the form of graphs in a real-time distributed environment.

In embodiments relating to social network data streams, changes in trends can be reported by means of graphical representation and by analysing the various structural properties of social graphs to track the changes. Structural properties of social graphs are analysed to determine change in trends, which can be tracked over time i.e. subsequent sliding windows It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of processing a data stream of a communication network in a distributed processing system comprising a plurality of processing units, the method comprising the steps of:
    extracting data from the data stream, wherein the data is extracted for a particular time window of a sliding time window;
    converting the extracted data into a format suitable for graphical representation;
    generating a graphical representation of the converted extracted data;
    determining a first estimated value of a first structural property of the graphical representation of the data;
    determining a second estimated value of a second structural property of the graphical representation of the data;
    comparing the first estimated value of the first structural property with a first threshold value;
    comparing the second estimated value of the second structural property with a second threshold value; and
    reporting a change condition based on the outcome of the comparison steps, wherein
    the graphical representation of the data comprises a set of vertices ($V=\{v1, v2, \ldots, vn\}$, where $n>2$) and a set of edges ($E=\{e1, e2, \ldots, em\}$, $m>2$), wherein each edge included in the set of edges connects one vertex from the set of vertices with another vertex from the set of vertices,
    the first estimated value of the first structural property of the graphical representation of the data comprises at least one of:
    an average clustering coefficient value based on a plurality of clustering coefficient values, each clustering coefficient value providing an indication regarding the degree to which vertices in the graphical representation tend to cluster together;
    an average degree value, relating to the number of edges m in the set of edges E in comparison to the number of vertices n in the set of vertices V; and
    a graph density value, relating to a measure of how many edges are in the set of edges E compared to a maximum possible number of edges between vertices in the set of vertices V, the second estimated value of the second structural property of the graphical representation of the data comprises at least one of:
a modularity value, relating to a measure of the strength of division of the graphical representation into modules; and
an average weighted degree value, relating to an average of the sum of weights of the edges of the nodes, and
the data stream is location specific, and wherein the step of reporting a change condition further comprises the steps of:
determining one or more overloaded antennae associated with the specific location involved;
identifying a sub-set of users that are operationally coupled to the one or more overloaded antennae; and
changing a service parameter of at least one of the identified sub-set of users.

2. The method as claimed in claim 1, wherein the first threshold value is determined during an initialization phase of operation, wherein the initialization phase of operation comprises the steps of:
retrieving a data stream relating to historical data;
generating a graphical representation of the historical data;
determining an estimated value for one or more structural properties of the graphical representation of the historical data; and
analyzing the first estimated value of the one or more structural properties to generate the first threshold value.

3. The method as claimed in claim 2, wherein the method further comprises the step of updating the first threshold value during use, by periodically performing the steps of claim 2 for more recent historical data, thereby adjusting the first threshold value dynamically during use.

4. The method as claimed in claim 1, wherein the first and second estimated values are combined to provide a single aggregated estimated value, the single aggregated estimated value being compared with a threshold value.

5. The method as claimed in claim 1, wherein an estimated value of a particular structural property is compared with a respective threshold value for that respective structural property.

6. The method as claimed in claim 1, wherein the step of generating a graphical representation comprises the step of interfacing with a graphical visualization unit to generate the graphical representation of the converted extracted data.

7. The method as claimed in claim 1, wherein the data stream is received from one or more locations of the communications network.

8. The method as claim in claim 1, wherein the step of changing a service parameter comprises the step of performing a location-based quality of service change.

9. The method as claimed in claim 1, wherein the data stream comprises one or more of:
data relating to call detail records of a telecommunications operator;
data relating to cell tower data of a telecommunications network;
data relating to user data of a telecommunications or communications network; and
data relating to a social network operating in a communications or a telecommunications network.

10. The method as claimed in claim 1, wherein the method steps are performed in a sequential manner at different processing units of the distributed processing system, such that a first processing unit is configured to process data relating to a first time window, while a second processing unit is configured to process data associated with a second time window that is subsequent to the first time window.

11. A distributed processing system for processing a data stream of a communications network, the distributed processing system comprising:
a first processing unit comprising one or more processors; and
a second processing unit comprising one or more processors, wherein the distributed processing system is configured to:
extract data from the data stream, wherein the data is extracted for a particular time window of a sliding time window;
convert the extracted data into a format suitable for graphical representation;
generate a graphical representation of the converted extracted data;
determine a first estimated value of a first structural property of the graphical representation of the data;
determine a second estimated value of a second structural property of the graphical representation of the data;
compare the first estimated value of the first structural property with a first threshold value;
compare the second estimated value of the second structural property with a second threshold value; and
report a change condition based on the outcome of the comparison steps, wherein
the graphical representation of the data comprises a set of vertices (V={v1, v2, . . . , vn}, where n>2) and a set of edges (E={e1, e2, . . . , em}, m>2), wherein each edge included in the set of edges connects one vertex from the set of vertices with another vertex from the set of vertices, and
the first estimated value of the first structural property of the graphical representation of the data comprises one or more of:
an average clustering coefficient value based on a plurality of clustering coefficient values, each clustering coefficient value providing an indication regarding the degree to which vertices in the graphical representation tend to cluster together;
an average degree value, relating to the number of edges m in the set of edges E in comparison to the number of vertices n in the set of vertices V; and
a graph density value, relating to a measure of how many edges are in the set of edges E compared to a maximum possible number of edges between vertices in the set of vertices V,
the second estimated value of the second structural property of the graphical representation of the data comprises at least one of:
a modularity value, relating to a measure of the strength of division of the graphical representation into modules; and
an average weighted degree value, relating to an average of the sum of weights of the edges of the nodes, and
the data stream is location specific, and wherein the step of reporting a change condition further comprises the steps of:
determining one or more overloaded antennae associated with the specific location involved;
identifying a sub-set of users that are operationally coupled to the one or more overloaded antennae; and
changing a service parameter of at least one of the identified sub-set of users.

12. The distributed processing system as claimed in claim 11, wherein the distributed processing system is configured to interface with a graphical visualization unit when generating the graphical representation of the converted extracted data.

13. The distributed processing system as claimed in claim 11, wherein the first threshold value is determined during an initialization phase of operation, and wherein the distributed processing system is configured during the initialization phase of operation to:
   retrieve a data stream relating to historical data;
   generate a graphical representation of the historical data;
   determine an estimated value for one or more structural properties of the graphical representation of the historical data; and
   analyze the first estimated value of the one or more structural properties to generate the first threshold value.

14. The distributed processing system as claimed in claim 11, wherein the distributed processing system is configured to combine the first and second estimated values to provide a single aggregated estimated value, the single aggregated estimated value being compared with a threshold value.

15. The method of claim 1, wherein
the first estimated value of the first structural property of the graphical representation of the data is an average clustering coefficient value based on a plurality of clustering coefficient values, each clustering coefficient value providing an indication regarding the degree to which vertices in the graphical representation tend to cluster together.

16. The method of claim 1, wherein
the second estimated value of the second structural property of the graphical representation of the data is an average weighted degree value, relating to the number of edges m in the set of edges E in comparison to the number of vertices n in the set of vertices V.

17. The method of claim 1, wherein
the first estimated value of the first structural property of the graphical representation of the data is a graph density value, relating to a measure of how many edges are in the set of edges E compared to a maximum possible number of edges between vertices in the set of vertices V.

* * * * *